Sept. 26, 1939.  E. G. GRUNDSTROM  2,173,999
FUSE PLUG FOR PRESSURE COOKERS
Original Filed Jan. 2, 1937
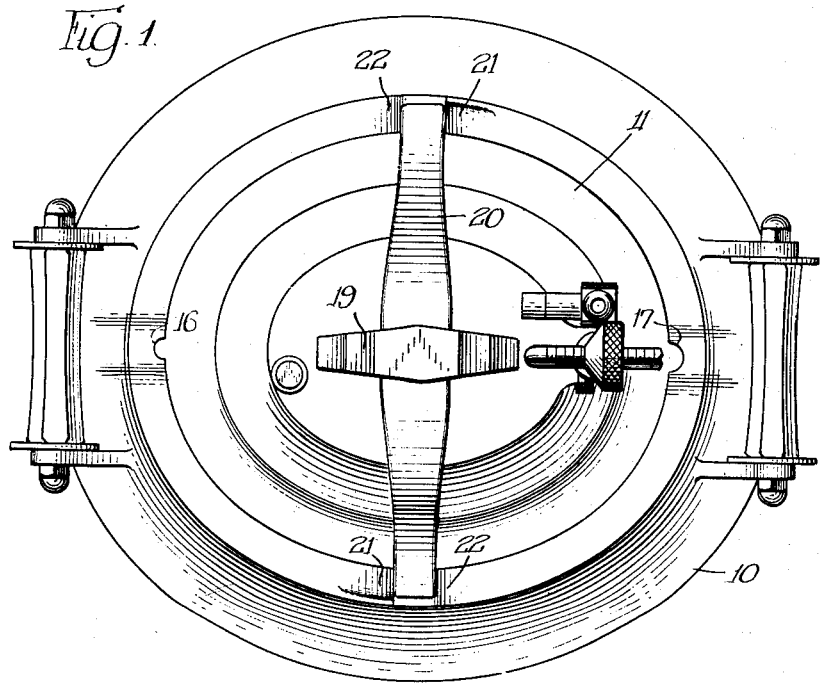
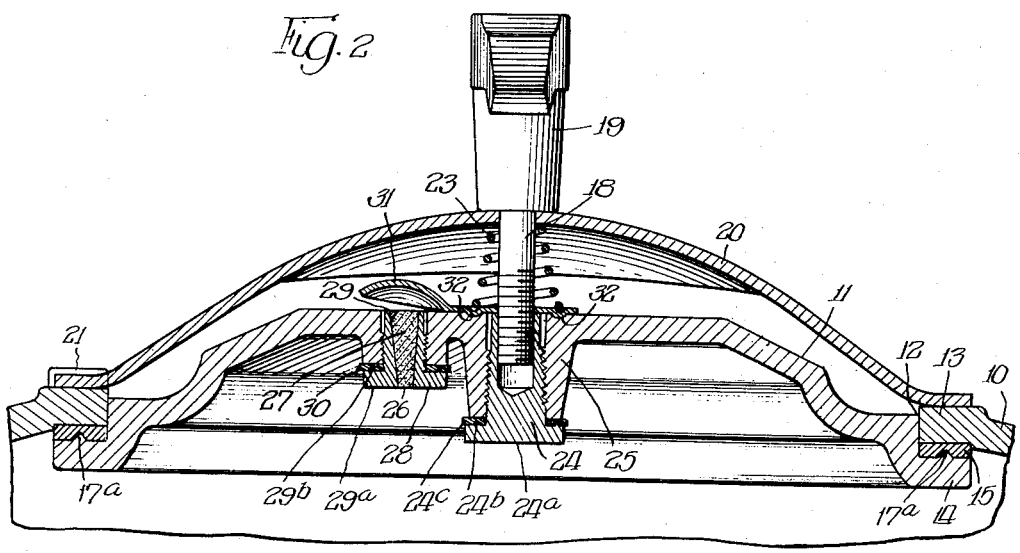
Inventor
Erik G. Grundstrom, Patented Sept. 26, 1939

2,173,999

UNITED STATES PATENT OFFICE 2,173,999

FUSE PLUG FOR PRESSURE COOKERS

Erik G. Grundstrom, Chicago, Ill., assignor to Advance Aluminum Castings Corp., Chicago, Ill., a corporation of Illinois Original application January 2, 1937, Serial No. 118,881. Divided and this application March 8, 1939, Serial No. 260,465

9 Claims. (Cl. 53—2)

The present invention relates to improvements in fuse plugs for pressure cookers.

The present application is a division of application Serial No. 118,881, filed January 2, 1937, by the present applicant.

The description of the present invention may be prefaced by the statement that in pressure cookers a vessel containing the material to be cooked is tightly sealed and heated to a sufficiently high temperature to cause the generation of steam either from the moisture of the material being cooked or from other liquid contained within said vessel. After a predetermined pressure has been attained, the vessel may be removed from the source of heat and the material therein subjected to temperature and pressure conditions for a predetermined length of time.

An object of the present invention is to provide an improved pressure cooker having novel fuse means for protecting said cooker against excessive temperature conditions, which fuse means is provided with guard means for preventing the spreading of the material within the cooker over the adjacent region.

A further object is to provide an improved pressure cooker well adapted to meet the needs of ordinary culinary service in the home or in a restaurant or the like.

Further objects will appear as the description proceeds.

Referring to the drawing—

Figure 1 is a top plan view of a pressure cooker embodying the principles of the present invention; and Figure 2 is a vertical sectional view on an enlarged scale.

The numeral 10 indicates a vessel. Said vessel 10 is provided with the elliptical opening 12 bounded by the flange 13. The cover 11 is provided with a flange 14 adapted to underlie the flange 13, the gasket 15 being provided between said flange 14 and said flange 13. As shown in Figure 1, the cover 11 is provided with a protuberance 16, preferably located at one extremity of the long axis of said cover, adapted to fit into a corresponding recess in the adjacent portion of the vessel 10. Said cover 11 at the other extremity of its long axis is provided with the protuberance 17 fitting into a corresponding recess in the vessel 10. Said protuberances 16 and 17 are preferably of different sizes, so that the operator of the pressure cooker will be guided by said protuberances in placing the cover 11 in proper position relative to the vessel 10. The gasket 15 is recessed to correspond to the protuberances 16 and 17. The flange 14 on its upper surface is provided with a bead 17a extending around the cover, which bead is adapted to embed itself into the gasket 15 when pressure is exerted between the flanges 13 and 14, as will be explained presently, thereby greatly improving the sealing action of the gasket 15. A further advantage of the bead 17a is that, since the gasket 15 will in service receive a more or less permanent indentation from the bead 17a, said bead and said indentation will constitute indicating means to insure the same setting of the gasket 15 with reference to the flange 14 at all times. Particularly in cooperation with the protuberances 16 and 17, the flanges 13 and 14 and the gasket 15 will always have the same setting relative to one another, thereby avoiding the faults of some gaskets that after they lose their original resiliency they lose their efficiency due to the fact that it is not possible to always reset them in correct relationship with reference to the members between which they are to perform their sealing functions.

Mounted centrally of the cover 11 is the upstanding threaded stud 18 having a handle 19 fixed to its upper extremity. Said handle 19 is preferably of heat insulating material, whereby the cover 11 and the vessel 10 may be readily manipulated. Underlying said handle 19 is the spring 20 rotatable about the stud 18 and having two extremities adapted to bear against the upper surface of the flange 13 of the vessel 10. Said extremities of said spring 20 are adapted to abut against abutments 21—21 formed integral with said flange 13 of the vessel 10. The upper surface of the flange 13 adjacent to the abutments 21—21 may be slightly raised, as indicated by the numerals 22—22, whereby as the spring 20 is turned away from its operative position as shown in Figure 1, said spring 20 will be quickly released without binding or unnecessary scratching of the surface of the flange 13.

The stud 18 which carries the handle 19 is screw-threaded within the cover 11, and a spring 23 is provided between the upper side of the cover 11 and the under side of the spring 20 for holding the extremities of the spring 20 away from the cover 11 when said cover is removed from the vessel 10. The spring 23, by holding the member 20 against the lower extremity of the handle 19, facilitates the handling of the entire cover assembly, as the distance between the cover and the lower extremity of the handle 19 will vary considerably. The handle 19 and its stud 18 are threaded into the nut 24, which nut is externally threaded within the boss 25 extending downwardly from the under side of the cover 11. The upper surface of the head 24a of the nut 24 is provided with the circular bead 24b adapted to embed itself into the gasket 24c.

The numeral 26 indicates as a whole a fuse plug carried by the cover 11. Said fuse plug includes the fusible element 27 mounted within the plug member 28, which plug member 28 is externally screw-threaded and is adapted to be mounted within a correspondingly tapped hole 29 in the cover 11. The plug member 28 is provided with the head 28a, by means of which the fuse plug 28 may be screwed tightly into position. The tapped hole 29 is tapped only at its lower end, and the plug member 28 is threaded only adjacent to the head 28a, and accordingly it is impossible to screw in the fuse plug 28 from the wrong direction. A gasket 30 is provided between the head 28a and the cover 11 for providing a tight joint. The upper surface of the head 28a will be provided with an annular bead 28b which will become embedded in the gasket 30 to provide a tight seal without requiring excessive tightening effort on said plug 28. As clearly shown in Figure 2, the fusible element 27 is tapered, the larger extremity thereof being uppermost. By reason of this construction, in the event that an excessive temperature is developed in the cooker, the fusible element 27 will first soften and be released from the plug member 28, permitting the escape of steam from within the vessel 10. By reason of this construction the melting of the fusible element 27 is avoided.

The numeral 31 indicates a shield covering the upper extremity of the hole 29. Said shield is releasably held in position by means of the spring 23 and is releasably held relative to the hole 29 by a pair of struck out portions 32—32 adapted to seat within corresponding recesses in the upper side of the cover 11. By reason of the shield 31, in the event that the fusible element 27 is released, juices and other fluid materials within the vessel 10 will be prevented from spurting over the region adjacent to the vessel 10, but will be deflected and merely flow downwardly on the cover 11 and along the sides of the vessel 10.

Though a preferred embodiment of the present invention has been described in detail, many modifications will occur to those skilled in the art. It is intended to cover all such modifications that fall within the scope of the appended claims.

What is claimed is—

1. In a pressure cooker, in combination, a vessel, a cover therefor, said cover having a rim portion adapted to contact on the inner wall of said vessel, a holding member adapted to contact with the outer surface of said vessel for holding said cover in position, spring means for holding said holding member away from said cover, a fuse plug in said cover, said fuse plug including a fusible element, and a shield for the aperture resulting when said fusible element gives way in response to temperature conditions, said spring member being positioned to hold said shield in shielding position.

2. In combination, a vessel, a cover therefor, said cover having a rim portion adapted to fit on the inside surface of said vessel, a bowed holding member for holding said cover in position, a spring member between said cover and said holding member, a handle for said cover, said handle being movable to control the tension of said bowed member, a fuse plug in said cover, and a shield for said fuse plug, said spring member being positioned to hold said shield in shielding position.

3. In a pressure cooker, in combination, a vessel, a cover therefor, a holding member for holding said cover in position on said vessel, a fuse plug in said cover, said fuse plug including a fusible element, said fusible element being of tapering conformation in cross section and having its greatest cross sectional area toward the outside of said cover, and a shield for the aperture resulting when said fusible element gives way in response to temperature conditions, said holding means being positioned to hold said shield in shielding position.

4. In a pressure cooker, in combination, a vessel, a cover therefor, a holding member for holding said cover in position on said vessel, a fuse plug in said cover, said fuse plug including a fusible element, said fusible element being of tapering conformation in cross section and having its greatest cross sectional area toward the outside of said cover, and a shield for the aperture resulting when said fusible element gives way in response to temperature conditions, said holding means being positioned to hold said shield in shielding position, said shield and said cover having cooperating projections and depressions for locating said shield.

5. A fuse plug adapted to be disposed in the cover of a pressure vessel, said fuse plug including a threaded plug member adapted to be screwed into said cover only from the under side thereof, and a fusible element within said plug, said fusible element being of tapering conformation increasing in diameter toward the outside of said cover.

6. A fuse plug adapted to be disposed in the cover of a pressure vessel, said fuse plug including a threaded plug member adapted to be screwed into said cover only from the under side thereof, a fusible element within said plug, said fusible element being of tapering conformation increasing in diameter toward the outside of said cover, and a shield overlying the outer end of said fusible element.

7. In combination with the cover of a pressure vessel, a threaded plug positioned in an aperture which extends through said cover, said plug and cover being so formed that said plug may be threaded into said cover only from the inner side of said cover, said plug having a head, the under side of said head being provided with an annular bead, and a gasket between the head of said plug and said cover, said bead being adapted to be embedded in said gasket.

8. In combination with the cover of a pressure vessel, a threaded plug positioned in an aperture which extends through said cover, said plug and cover being so formed that said plug may be threaded into said cover only from the inner side of said cover, said plug having a head, the under side of said head being provided with an annular bead, a gasket between the head of said plug and said cover, said bead being adapted to be embedded in said gasket, and a fusible element in said plug, said fusible element being of tapering conformation having its larger diameter adjacent to the outside of said cover.

9. In combination with the cover of a pressure vessel, a threaded plug positioned in an aperture which extends through said cover, said plug and cover being so formed that said plug may be threaded into said cover only from the inner side of said cover, said plug having a head, the under side of said head being provided with an annular bead, a gasket between the head of said plug and said cover, said bead being adapted to be embedded in said gasket, a fusible element in said plug, said fusible element being of tapering conformation having its larger diameter adjacent to the outside of said cover, and a shield covering said fusible element.

ERIK G. GRUNDSTROM.